United States Patent
Shankar et al.

(10) Patent No.: US 8,510,543 B1
(45) Date of Patent: Aug. 13, 2013

(54) FIRMWARE SUPPORTING MULTIPLE BOOT PATHS

(75) Inventors: Subramonian Shankar, Norcross, GA (US); Jacob Narey, Lawrenceville, GA (US); Will Gysin, Jefferson, GA (US)

(73) Assignee: American Megatrends, Inc., Norcross, GA (US)

( * ) Notice: Subject to any disclaimer, the term of this patent is extended or adjusted under 35 U.S.C. 154(b) by 417 days.

(21) Appl. No.: 12/786,973

(22) Filed: May 25, 2010

Related U.S. Application Data

(60) Provisional application No. 61/181,846, filed on May 28, 2009.

(51) Int. Cl.
*G06F 9/24* (2006.01)
*G06F 15/177* (2006.01)

(52) U.S. Cl.
USPC .............. 713/2; 713/1; 713/100; 710/10

(58) Field of Classification Search
USPC .................. 713/1, 2, 100; 710/10
See application file for complete search history.

(56) References Cited

U.S. PATENT DOCUMENTS

| | | | | |
|---|---|---|---|---|
| 6,138,234 | A * | 10/2000 | Lee et al. | 713/2 |
| 7,117,302 | B2 * | 10/2006 | Lundeby et al. | 711/111 |
| 7,234,051 | B2 * | 6/2007 | Munguia et al. | 713/2 |
| 7,451,302 | B2 * | 11/2008 | Michaelis et al. | 713/2 |
| 7,516,315 | B2 * | 4/2009 | Wood et al. | 713/1 |
| 7,669,048 | B2 * | 2/2010 | Frank et al. | 713/2 |
| 7,886,140 | B2 * | 2/2011 | Jiang | 713/2 |
| 2004/0143729 | A1 * | 7/2004 | Bouchier et al. | 713/100 |

* cited by examiner

*Primary Examiner* — Thuan Du
(74) *Attorney, Agent, or Firm* — Parks IP Law LLC; Jennifer P. Medlin, Esq.

(57) ABSTRACT

Technologies for a basic input/output system (BIOS) firmware that can take different boot paths depending on the operating system that a user selects to boot within a computer system are described herein. Each boot path can handle initialization differently based upon the needs of the operating system and overall project design. A method for supporting multiple boot paths on a computer includes receiving a boot path indicator that indicates a boot path to be executed. Once the boot path indicator is received, the boot path corresponding to the boot path indicator is executed and an operating system corresponding to the boot path indicator is booted.

20 Claims, 4 Drawing Sheets

FIRMWARE SUPPORTING MULTIPLE BOOT PATHS

CROSS-REFERENCE TO RELATED APPLICATIONS

This application claims the benefit of U.S. provisional patent application No. 61/181,846, filed on May 28, 2009, which is expressly incorporated herein by reference in its entirety.

BACKGROUND

Traditionally, computers may boot to only one operating system. Leveraging technologies like virtualization, computers may now be loaded with different operating systems. In this way, a user may boot to the operating system of the user's choice. In such systems, the Basic Input/Output System (BIOS) firmware is typically configured to initialize the system in a single manner prior to booting the operating system selected by the user.

Different operating systems may require the BIOS firmware to perform a different system initialization prior to booting. For example, WINDOWS XP from MICROSOFT CORPORATION may require the BIOS firmware to initialize a graphics device before the operating system takes control. However, this may not be the case for certain LINUX distributions. In particular, LINUX can support initializing the graphics devices during kernel initialization. As a result, LINUX does not require the BIOS firmware to initialize the graphics devices before the operating system takes control. Other operating systems, such as real-time operating systems (RTOS) may require the BIOS firmware to initialize very few system components prior to booting.

It is with respect to these and other considerations that the disclosure presented herein has been made.

SUMMARY

The following disclosure is directed to technologies for a basic input/output system (BIOS) firmware. Through the utilization of the technologies and concepts presented herein, the BIOS firmware can take different boot paths depending on the operating system that a user selects to boot within a computer system. Each boot path can handle initialization differently based upon the needs of the operating system and overall project design.

According to one aspect, a method for supporting multiple boot paths on a computer includes receiving a boot path indicator that indicates a boot path to be executed. Once the boot path indicator is received, the boot path corresponding to the boot path indicator is executed and an operating system corresponding to the boot path indicator is booted.

It should be appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
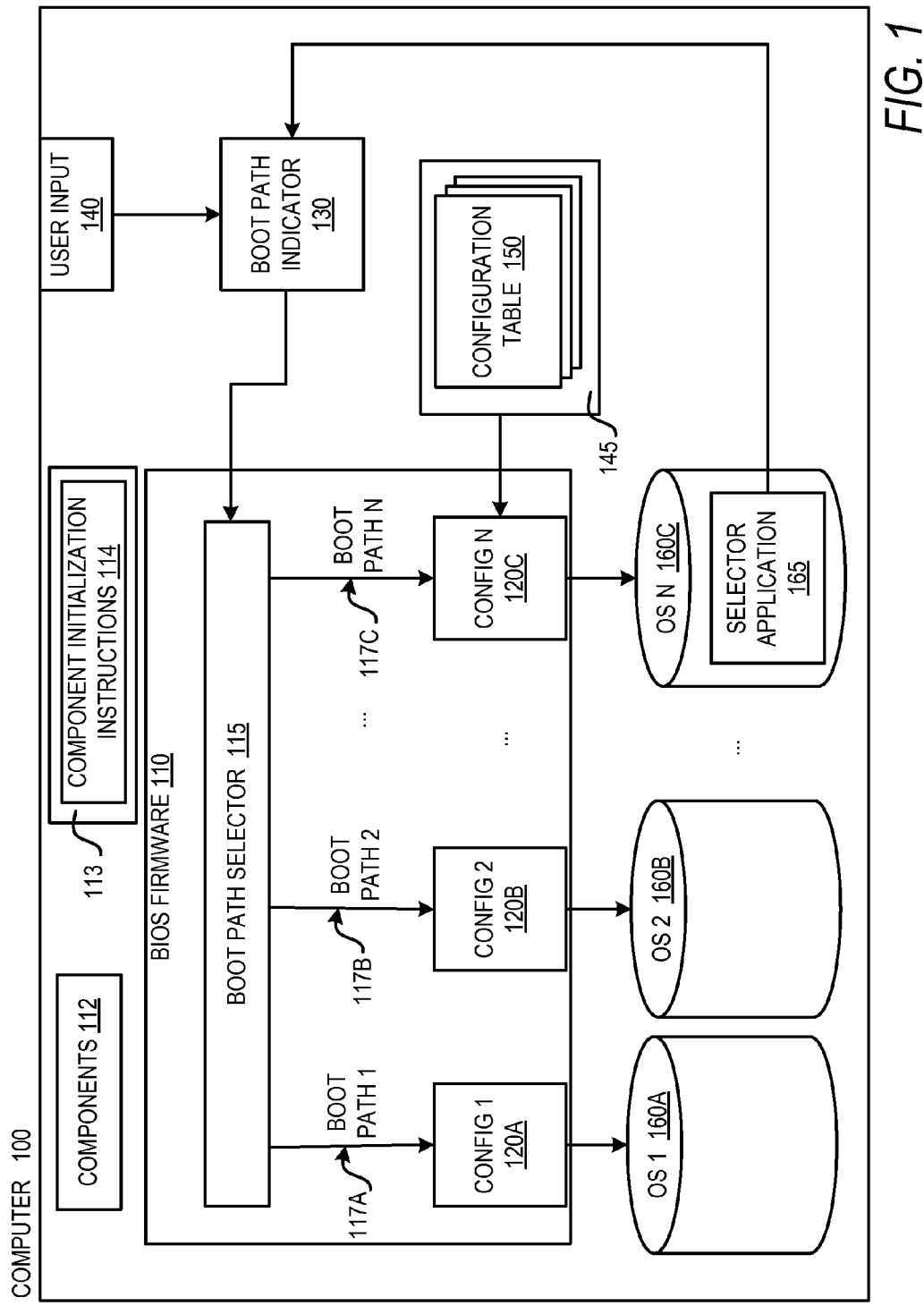
FIG. 1 is a computer software and hardware architecture diagram showing an illustrative operating environment along with several software components provided in embodiments disclosed herein.

The following disclosure is directed to technologies for a basic input/output system (BIOS) firmware. Through the utilization of the technologies and concepts presented herein, the BIOS firmware can take different boot paths depending on the operating system that a user selects to boot within a computer system. Each boot path can handle initialization differently based upon the needs of the operating system and overall project design.

Support for different boot paths within the BIOS firmware can provide the user with a full featured firmware configuration path along with one or more other alternately configured firmware configuration paths. When the full featured firmware configuration path is chosen, the BIOS firmware may perform a full system initialization. The full system initialization may include initializing all or most of the system components capable of being initialized by the BIOS firmware, providing options such as booting an operating system from any of several different device types, and/or allowing the user to enter a BIOS setup mode. The full featured firmware configuration path may be more suited for operating systems, such as MICROSOFT WINDOWS, that may take control after a wide variety of system components are initialized by the BIOS firmware.

An example of an alternately configured firmware path is a fast-boot firmware configuration path, which is configured to decrease the time taken to boot to an operating system. In particular, the fast-boot firmware configuration path may initialize a reduced number of system components in order to improve speed and decrease boot time. For example, some operating systems can initialize universal serial bus (USB) devices during operating system runtime. In such operating systems that can handle USB initialization, the BIOS firmware may skip the USB initialization when the fast-boot firmware configuration path is taken, thereby substantially decreasing the time taken to initialize the computer prior to launching the operating system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following description, references are made to the accompanying drawings that form a part hereof, and which are shown by way of illustration, specific embodiments, or examples. Referring now to the drawings, in which like numerals represent like elements throughout the several figures, aspects of a BIOS firmware supporting multiple boot paths will be described.

Turning now to FIG. 1, details will be provided regarding an illustrative operating environment and several software components provided by the embodiments presented herein. In particular, FIG. 1 shows aspects of a computer 100 with a BIOS firmware 110 supporting multiple boot paths according to one or more embodiments presented herein. The computer may also include components 112, which may include one or more devices, modules, and subsets of modules, amongst other hardware and software system components well known in the art. According to embodiments, some components 112 may be stored within the BIOS firmware 110. In addition, the computer 100 may also include an instruction store 113 for storing component initialization instructions 114 for initializing one or more of the components 112. It should be appreciated that the instruction store 113 may be within the BIOS firmware 110 of the computer 100, or outside of the BIOS firmware 100. The BIOS firmware 110 may be configured to support a boot path selector 115. The boot path selector 115 may define multiple boot paths, such as a boot path one 117A, a boot path two 117B, and a boot path N 117C, for the computer 100. The boot paths 117A-117C may be referred to collectively, or generally, as boot paths 117.

Each of the boot paths 117 associated with the BIOS firmware 110 may be configured to guide the BIOS firmware 110 to perform a corresponding system configuration, such as a configuration one 120A, a configuration two 120B, and a configuration N 120C. The configurations 120A-120C may be referred to collectively, or generally, as configurations 120. Each of the configurations 120 may include a set of component initialization instructions 114 executed by the BIOS firmware 110 that initialize one or more of the components 112 of the computer 100. When one of the boot paths 117 guides the BIOS firmware 110 to perform a corresponding configuration 120, the BIOS firmware 110 initializes one or more of the components 112 of the computer 100 corresponding to the particular configuration 120. For example, the boot path one 117A may guide the BIOS firmware 110 to perform a corresponding configuration one 120A in order to initialize a first set of the components 112 as specified by the configuration one 120A. The boot path two 117B may guide the BIOS firmware 110 to perform a corresponding configuration two 120B in order to initialize a second set of the components 112 as specified by the configuration two 120B. The boot path N 117C may guide the BIOS firmware 110 to perform a configuration N 120C in order to initialize a third set of the component 112 as specified by the configuration N 120C.

The BIOS firmware 110 may follow a particular boot path 117 according to a boot path indicator 130. The boot path selector 115 within the BIOS firmware 110 may receive a boot path indicator 130 indicating the particular boot path 117 that should be followed for a given instance of booting the computer 100. As mentioned above, each of the boot paths 117 may guide the BIOS firmware 110 to perform a system configuration, such as the configurations 120 or any other configuration capable of being performed by a boot path 117 associated with the BIOS firmware 110. Once a boot path 117 guides the BIOS firmware 110 to perform the corresponding configuration 120, the boot path 117 may then guide the BIOS firmware 110 to launch an operating system, such as operating system one 160A, operating system two 160B, or operating system N 160C. The operating systems 160A-160C may be referred to in general, or collectively, as operating systems 160.

According to embodiments, each of the boot paths 117 may be configured to guide the BIOS firmware 110 to perform a corresponding configuration 120 that is compatible with the particular operating system 160 launched via each of the booth paths 117. As a result, the configurations 120 may differ depending on the particular operating system 160. For example, the system configuration 120A associated with the operating system 160A may be different from the system configuration 120B associated with the operating system 160B.

The computer 100 may comprise a standard notebook, laptop, or desktop computing system capable of executing the operating systems 160A-160C. It should be appreciated, however, that the computer 100 may comprise other types of computing devices, including a multimedia internet device (MID), a netbook, or other type of small form factor computing device. The BIOS firmware 110 associated with the computer 100 may be a BIOS, a legacy BIOS, an extensible firmware interface (EFI) firmware, a unified EFI (UEFI) firmware, or any other firmware configured to support operation of the computer 100.

It should also be appreciated that the operating systems 160A-160C may be any operating system configured to provide functionality to a desktop or laptop computing system. For example, according to embodiments, the operating systems 160A-160C may comprise one of the WINDOWS family of operating systems from MICROSOFT CORPORATION, the MAC OS X operating system from APPLE INC., the LINUX operating system, or another type of computer operating system known in the art. The operating systems 160, or boot loaders configured to load at least one of the operating systems 160, may be stored in flash memory, USB devices, hard drives, drive partitions, drive images, virtual machine images, other storage devices, or any combination thereof.

The boot path indicator 130 may be provided by a user input 140. The user input 140 may include a hotkey, switch, button, or other input operated by the user at, or prior to, boot time of the computer 100. For example, depressing a particular number of a keyboard at boot time may indicate to the BIOS firmware 110 to select the boot path 117 associated with that number. For example, the keyboard button for the number one may indicate following boot path one 117A while the keyboard button for number five may indicate following boot path five. Alternatively, a switch or set of dedicated buttons on the computer 100 may be operated at boot time to provide the boot path indicator 130 for selecting the particular boot path 117 for that instance of booting the computer 100.

A boot path selector application 165 may run in association with the BIOS firmware 110 or the operating system 160. The boot path selector application 165 may be configured to select the boot path 117 to follow upon rebooting the computer 100. The boot path selector application 165 may select a boot path 117 to follow upon receiving an input from a user. Alternatively, the boot path selector application 165 may select a boot path 117 based on an event occurring in the operating system 160. For instance, the operating system 160 may fail to successfully install an application causing a portion of the operating system to crash. In such an event, the boot path selector application 165 may select a boot path 117 configured to boot the same operating system 160 in a safe mode upon rebooting the computer 100.

In various embodiments, the boot path selector application 165 may set a value that indicates the boot path 117 that the boot path selector 115 should select upon rebooting the computer 100. For example, the boot path selector application 165 may set the value within a non-volatile memory or battery-backed memory within the computer 110. This value may be retrieved as the boot path indicator 130 upon subsequent booting of the computer 100. Alternatively, the boot path selector application 165 may place information associated with the boot path indicator 130 into a specific volatile memory location for retrieval upon the next boot instance or reset of the computer 100 where power is not lost to the volatile memory.

While the operating systems 160A-160C are illustrated in FIG. 1 as independent operating system installations, one or more of the operating systems 160 may be shared by multiple boot paths 117. Such a shared operating system 160 may be booted following more than one of the boot paths 117. For example, boot path one 117A and boot path two 117B may both boot the identical operating system 160A from an identical partition image or volume. However, boot path one 117A and boot path two 117B may invoke different configurations 120. According to one example, boot path one 117A may guide the BIOS firmware 110 to perform configuration one 120A, which includes a full initialization of underlying video hardware, while boot path two 117B may guide the BIOS firmware 110 to perform configuration two 120B, which includes initializing a limited subset of video support in comparison to configuration one 120A.

Each boot path 117 may guide the BIOS firmware 110 to perform a particular configuration 120, such that the computer presents a suitable platform for launching the operating system 160 targeted by the respective boot path. For example, a first boot path having a configuration 120 defining a full system configuration may invoke initializing all, or most, components defined within the computer 100. Such a full configuration boot path may, for example, be associated with a first type of operating system, such as a single-user, multi-tasking operating system such as MICROSOFT WINDOWS. Generally, single-user, multi-tasking operating systems allow a user to have several different programs operating at the same time.

Similarly, a second boot path may guide the BIOS firmware 110 to perform a partial configuration 120 that avoids configuring video or video option ROM support. The partial configuration 120 is of a slightly more limited nature relative to the full system configuration corresponding to the first boot path that avoids configuring video or video option ROM support. For example, the second boot path may support a second type of operating system, such as a single-user, single task operating system such as PALM OS. Single-user, single task operating systems may be designed to manage the computer so that one user can effectively do one thing at a time. Similarly, a third boot path may support a configuration 120 of an even more limited nature wherein support for USB devices, file systems, file system partitions, and video are not provided within the configuration 120. The third boot path of a more limited nature may support a third type of operating system, such as a real-time operating system, an embedded operating system, or a smart phone operating system. The three types of operating systems may provide initialization and low level support for all components, including devices and modules used in conjunction with the respective operating system.

According to another example, a separate boot path may define a diagnostic configuration where the associated configuration 120 is of a limited nature but still launches a full operating system 160, such a MICROSOFT WINDOWS. Such a boot path may be used for diagnostic purposes or safe mode operation.

Each boot path 117 may be configured to guide the BIOS firmware 110 to perform a configuration 120 that corresponds to a respective configuration table 150. The configuration table 150 associated with each configuration 120 may include configuration information that specifies components 112 of the computer 100 to be initialized within the respective boot path. The configuration information may also specify a particular operating system 160 to launch upon initializing the components included in the respective boot path. The components 112 may include one or more devices and/or one or more modules or subsets of modules within the BIOS firmware 110. Alternatively, each configuration table 150 may specify components to exclude from initialization or execution during the respective boot path. Each of the components 112 within the configuration tables 150 may be identified by a unique identifier or a global unique identifier (GUID).

In addition to, or instead of, utilizing a configuration table, such as configuration table 150A for performing a corresponding configuration 120A, the BIOS firmware 110 may utilize the boot path indicator 130 directly to generate the configuration 120A. According to embodiments, the boot path indicator 130 may be checked and used as a gating mechanism as the boot path 117A guides the BIOS firmware 110 to perform the corresponding configuration 120A. For example, a BIOS firmware module for identifying option ROMs to be loaded may skip loading option ROMs with the specific exception of a video BIOS (VBIOS) according to the boot path indicator 130. This may be possible by configuring the boot path indicator 130 to indicate the components 112 of the computer 100 that are to be initialized. In such embodiments where the boot path indicator 130 is capable of indicating the components 112 of the computer 100 that are to be initialized, the boot path indicator 130 may include information contained in the configuration table 150. In this way, the BIOS firmware 110 may be able to perform the configuration 120 without having to access the configuration table 150. Such gating may support a finer granularity of inclusion or exclusion within a boot path configuration 120 in comparison to using GUIDs to include or exclude entire BIOS firmware modules 112.

The BIOS firmware 110 may also check the boot path indicator 130 to vary operation of the BIOS firmware 110 based on the boot path indicator 130. For example, a normal boot path and a diagnostic boot path may each have separate boot path indicators 130 and may both support a user entering into a setup mode. The setup mode may be configured to allow a user to alter the settings of the BIOS firmware and/or the computer 100. This may include allowing the user to select booting an operating system from a CD-ROM or from a memory location of the computer 100. According to embodiments, a setup interface may display different information and setup options for the normal boot mode than while in the diagnostic boot mode. Depending upon the boot path indicator 130, a diagnostic mode setup configuration mode may be displayed or a normal setup configuration mode may be displayed. Various other examples of gating, varying, or modifying operation of the BIOS firmware 110 based on the boot path indicator 130, a configuration table 150, or both may be supported.

This notion of multiple boot paths may also be applied to multiple instances of the BIOS firmware 110. The multiple instances of BIOS firmware 110 may be selectively invoked depending upon the operating system 160 being launched. According to embodiments, the computer 100 may also include more than one BIOS firmware. In such embodiments, each BIOS firmware may be programmed to follow a single boot path 117 corresponding to the requirements of the operating system 160 that may be booted by the BIOS firmware. Depending upon the operating system 160 that is to be booted, the computer 100 may invoke a particular BIOS firmware corresponding to the operating system 160. In various embodiments, the BIOS firmware may be programmed to follow more than one boot paths 117 corresponding to the requirements of one or more operating systems 160 that may be booted by the BIOS firmware. In such embodiments, the computer 100 may execute a particular boot path 117 of a particular BIOS firmware according to a selection made through a user input or the boot path selector application 165.

Figure 2:
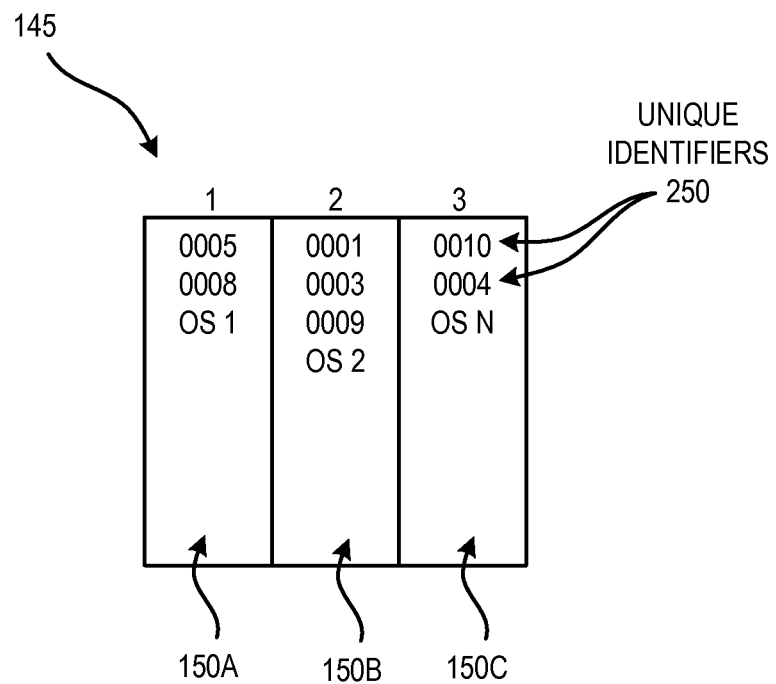
FIG. 2 is a data structure diagram showing one aspect of configuration tables provided in embodiments disclosed herein.

Turning now to FIG. 2, a data structure diagram illustrates three configuration tables 150A, 150B, 150C according to one or more embodiments presented herein. Each column within the data structure 200 may represent a configuration table 150 associated with a particular configuration 120. The configuration tables 150A-150C may be referred to collectively, or generally, as configuration table 150. While three columns or three configuration tables 150 are illustrated, it should be appreciated that any number of configuration tables 150 may be stored within the data structure 200.

Each column, or configuration table 150, may correspond to a configuration 120 associated with a particular boot path 117 of the BIOS firmware 110. The entries, or rows, within the configuration tables 150 may specify one or more of the components 112, such as devices, modules, and/or subsets of modules. The components 112 may be identified by unique identifiers 250. For example, the configuration table 150B associated with boot path two 117B may specify identifiers 0001, 0003, and 0009, which identify three of the components 112. These three components may be specified within the configuration table 150B associated with boot path two 117B in order to indicate the components to be included within the configuration 120. Alternatively, the unique identifiers 250 may indicate the components to be skipped, or excluded, when the boot path 118 performs the respective configuration 120.

According to another embodiment, the data structure 200 may be formed as a matrix of columns, each of which is associated with a boot path and rows each associated with one of the firmware modules 220. Each entry of the matrix may be populated with an identifier having at least a first value or a second value. The first value may specify that the respective component is included. The second value may specify that the respective component is excluded It should be appreciated that the data structure 200 may be formed according to any other data structure for storing the unique identifiers 250 associated with each respective configuration table 150. For example, the data structure may be a matrix, an array, an array of arrays, a linked list, an array of linked lists, a linked list of linked lists, or any other possible static or dynamic data structure as understood in the art.

Figure 3:
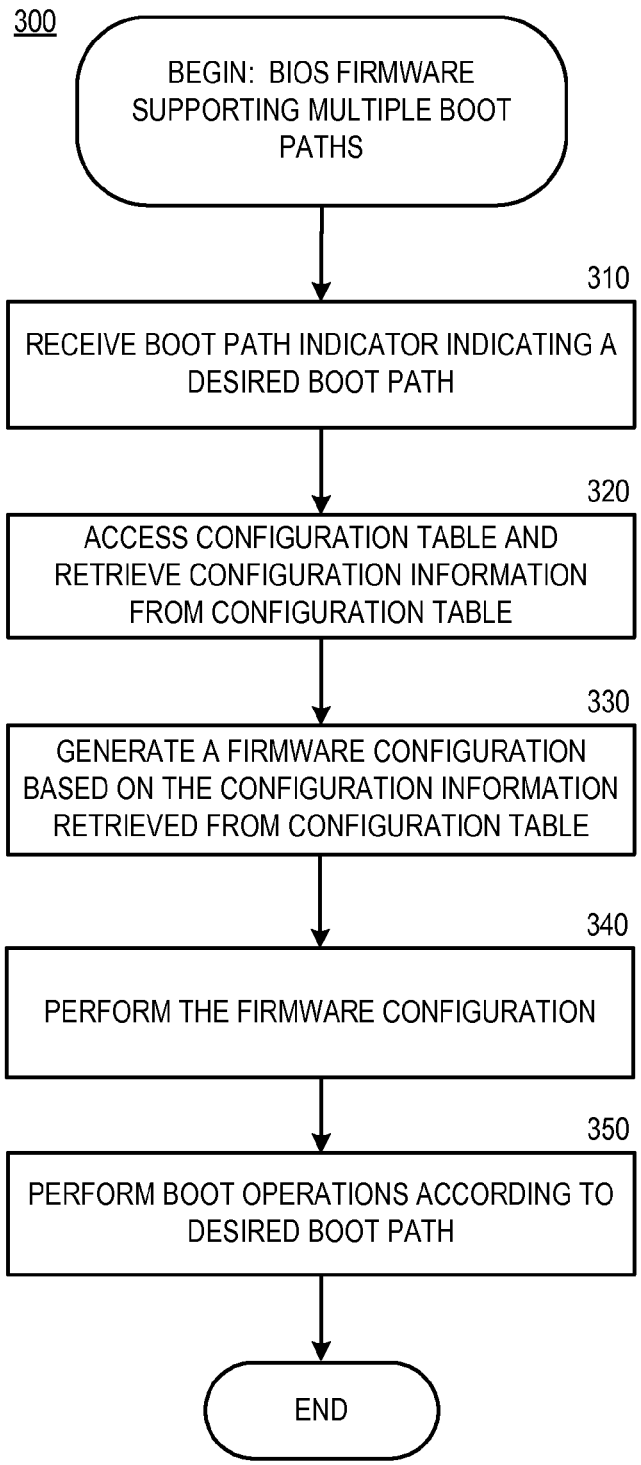
FIG. 3 is a flow diagram showing one illustrative process presented herein for a BIOS firmware supporting multiple boot paths.

Referring now to FIG. 3, additional details will be provided regarding the embodiments presented herein for a firmware supporting multiple boot paths. In particular, FIG. 3 is a flow diagram illustrating aspects of the operation of a process 300 presented herein for selecting multiple boot paths in association with a BIOS firmware 110 in the manner disclosed herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 310 where the boot path selector 115 may receive a boot path indicator 130. As described above, the boot path indicator 130 may indicate to the boot path selector 115 within the BIOS firmware 110 the boot path that should be followed for a given instance of booting the computer 100. The boot path indicator 130 may be received as a user input 140. Alternatively, the boot path indicator 130 may be provided by a boot path selector application 165. The boot path selector 115 may receive the boot path indicator 130 at boot time.

At operation 320, the BIOS firmware 110 may access a configuration table 150 associated with the desired boot path and retrieve configuration information from the configuration table 150. The configuration table 150 may be stored within the computer 100. When the BIOS firmware 110 follows a particular boot path, such as boot path 117A, the BIOS firmware 110 may be instructed to access the configuration table 150A associated with the boot path 117A in order to retrieve configuration information specifying the components 112 to initialize. The desired boot path may be specified by the boot path indicator 130 as discussed with respect to operation 310. The configuration table 150 associated with the desired boot path may include configuration information that specifies the components 112, such as devices, modules or subsets of modules for inclusion in the configuration 120 associated with the respective boot path. Alternatively, the configuration table 150 may specify components 112 to be excluded from the configuration 120.

Continuing to operation 330, the BIOS firmware 110 utilizes the configuration information retrieved from the configuration table 150 to generate a configuration corresponding to the configuration table 150. According to embodiments, the BIOS firmware 110 may generate the configuration by retrieving component initialization instructions 114 from the instruction store 113. The component initialization instructions 114 retrieved from the instruction store 113 may correspond to the components 112 specified by the configuration information associated with the configuration table 150 for inclusion in the configuration 120.

Once the configuration 120 is generated by the BIOS firmware 110, the routine 300 proceeds to operation 340, where the BIOS firmware 110 performs the configuration 120 associated with the configuration table 150. As described above, the configuration 120 may include a set of component initialization instructions 114 corresponding to the components 112 indicated in the configuration table 150 for inclusion in the configuration 120. Accordingly, the BIOS firmware 110 executes these sets of component initialization instructions 114 corresponding to the configuration table 150. In this way, the BIOS firmware 110 initializes one or more components within the BIOS firmware 110 such that the computer 100 is initialized according to the configuration 120.

Continuing to operation 350, the BIOS firmware 110 may mount and launch a boot device containing an operating system 160 according to the specified boot path 117. The operating system 160, or associated boot device, may be specified within the configuration table 150, in association with the configuration table 150, or in other information associated with each particular boot path.

Figure 4:
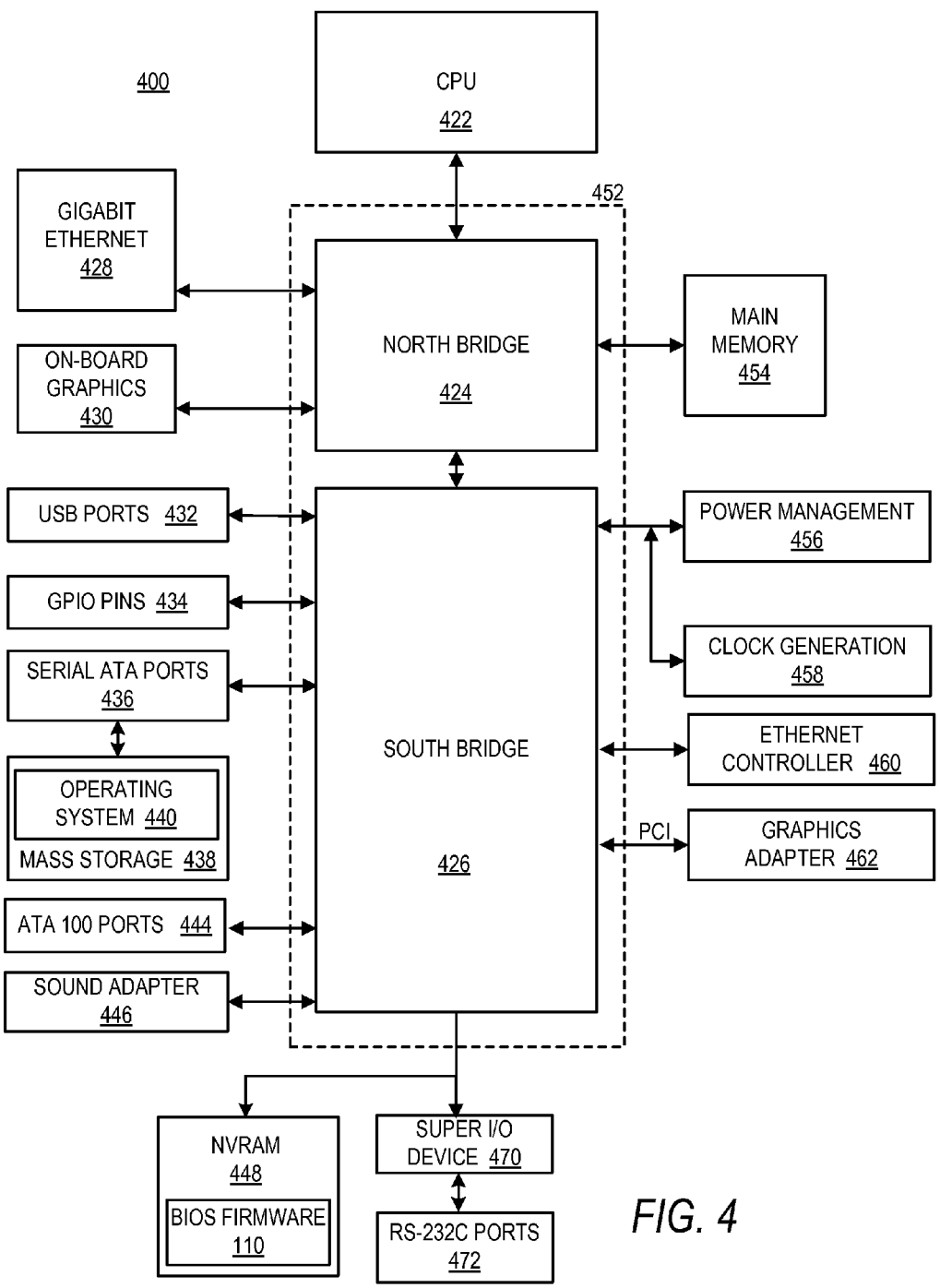
FIG. 4 is a computer architecture diagram showing an illustrative computer architecture that might be utilized to implement a computing system that embodies the various concepts and technologies presented herein.

FIG. 4 shows an illustrative computer architecture for a computer 400 that may be utilized in the implementations described herein. The architecture shown in FIG. 4 may be utilized to embody the computer 100 shown in FIG. 1 and described above.

The computer 400 includes a baseboard, or "motherboard", which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The computer 400 may include a multitude of CPUs 422.

The chipset 452 includes a north bridge 424 and a south bridge 426. The north bridge 424 provides an interface between the CPU 422 and the remainder of the computer 400. The north bridge 424 also provides an interface to a random access memory (RAM) used as the main memory 454 in the computer 400 and, possibly, to an on-board graphics adapter 430. The north bridge 424 may also include functionality for providing networking functionality through a gigabit Ethernet adapter 428. The gigabit Ethernet adapter 428 is capable of connecting the computer 400 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 400. In particular, the south bridge 426 may provide one or more universal serial bus (USB) ports 432, a sound adapter 446, an Ethernet controller 460, and one or more general purpose input/output (GPIO) pins 434. The south bridge 426 may also provide a bus for interfacing peripheral card devices such as a graphics adapter 462. In one embodiment, the bus comprises a peripheral component interconnect (PCI) bus, but other types of busses may be utilized.

The south bridge 426 is also operative to provide one or more interfaces for connecting mass storage devices to the computer 400. For instance, according to an embodiment, the south bridge 426 includes a serial advanced technology attachment (SATA) adapter for providing one or more serial ATA ports 436 and an ATA 100 adapter for providing one or more ATA 100 ports 444. The serial ATA ports 436 and the ATA 100 ports 444 may be, in turn, connected to one or more mass storage devices storing an operating system 440 and application programs, such as the SATA disk drive 438. As discussed above, an operating system 440 comprises a set of programs that control operations of a computer and allocation of resources. An application program is software that runs on top of the operating system software, or other runtime environment, and uses computer resources to perform application specific tasks desired by the user. As also discussed above, the computer 400 may be configured in the manner described above in conjunction with a firmware supporting multiple boot paths.

The mass storage devices connected to the south bridge 426, and their associated computer-readable media, provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400.

Computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the BIOS firmware 110 that includes program code containing the basic routines that help to start up the computer 400 and to transfer information between elements within the computer 400. As discussed above, the BIOS firmware 110 may support multiple boot paths.

The computer 400 may be implemented as a conventional computer system, an embedded control computer, a laptop, or a server computer, a mobile device, a set-top box, a kiosk, a vehicular information system, a mobile telephone, a customized machine, or other hardware platform. The CPU 422 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The BIOS firmware 110 may comprise program modules firmware configured for supporting multiple boot paths. The program modules may include software instructions that, when loaded into the CPU 422 and executed, transform a general-purpose computing system into a special-purpose computing system customized to facilitate all, or part of, the multiple boot path firmware techniques disclosed herein. As detailed throughout this description, the program modules may provide various tools or techniques by which the computer 400 may participate within the overall systems or operating environments using the components, logic flows, and/or data structures discussed herein.

The CPU 422 may be constructed from any number of transistors or other circuit elements, which may individually or collectively assume any number of states. More specifically, the CPU 422 may operate as a state machine or finitestate machine. Such a machine may be transformed to a second machine, or specific machine by loading executable instructions contained within the program modules. These computer-executable instructions may transform the CPU 422 by specifying how the CPU 422 transitions between states, thereby transforming the transistors or other circuit elements constituting the CPU 422 from a first machine to a second machine, wherein the second machine may be specifically configured to support multiple boot path firmware. The states of either machine may also be transformed by receiving input from one or more user input devices, network interfaces 460, 428, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 454, 448 when the software is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

It should be appreciated that the computer 400 may comprise other types of computing devices, including hand-held computers, netbooks, MIDs, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for firmware supporting multiple boot paths are provided herein. Although the subject matter presented herein has been described in language specific to computer structural features, methodological and transformative acts, specific computing machinery, and computer readable media, it is to be understood that the disclosure presented herein is not necessarily limited to the specific features, acts, or media described herein. The subject matter described above is provided by way of illustration only and should not be construed as limiting. Various modifications and changes may be made to the subject matter described herein without following the example embodiments and applications illustrated and described, and without departing from the true spirit and scope of the disclosure presented herein.

What is claimed is:

1. A computer-implemented method for supporting multiple boot paths on a computer including Basic Input/Output System (BIOS) firmware, the method comprising performing computer-implemented operations for:
    receiving a boot path indicator indicating a booth path, among the multiple boot paths, to be executed by the BIOS firmware;
    responsive to receiving the boot path indicator, executing, by the BIOS firmware, the boot path corresponding to the boot path indicator, wherein executing the boot path corresponding to the boot path indicator comprises:
        retrieving configuration information associated with the boot path corresponding to the boot path indicator;
        generating a configuration of the firmware that is associated with the boot path based on the retrieved configuration information; and
        performing the configuration of the firmware, including initializing at least one firmware module that is specified by the retrieved configuration information associated with the boot path; and
    launching, by the BIOS firmware, an operating system, among a plurality of operating systems, that is supported by the boot path that corresponds to the boot path indicator.

2. The computer-implemented method of claim 1, wherein retrieving the configuration information associated with the boot path corresponding to the boot path indicator comprises accessing a configuration table associated with the boot path, wherein the configuration is performed based on information specified in the accessed configuration table.

3. The computer-implemented method of claim 2, wherein performing the configuration comprises initializing at least one firmware module specified in the configuration table.

4. The computer-implemented method of claim 2, wherein performing the configuration comprises excluding initialization of at least one firmware module specified in the configuration table.

5. The computer-implemented method of claim 1, wherein launching the operating system comprises mounting a boot device containing the operating system corresponding to the boot path.

6. The computer-implemented method of claim 1, wherein receiving a boot path indicator configured to indicate a boot path to be executed comprises receiving the boot path indicator from a user input including at least one of a hotkey, a switch, a button and other input operated by a user.

7. The computer-implemented method of claim 1, further comprising setting, by a boot path selector application, a value corresponding to the boot path indicator within a non-volatile memory.

8. The computer-implemented method of claim 7, further comprising retrieving the value corresponding to the boot path indicator, set by the boot path selector application, from the non-volatile memory upon subsequent booting of the computer.

9. A non-transitory computer-readable storage medium having computer-executable instructions stored thereupon which, when executed by a computer including Basic Input/Output System (BIOS) firmware, cause the computer to perform operations comprising:
    receiving a boot path indicator indicating a boot path, among multiple boot paths, to be executed by the BIOS firmware;
    responsive to receiving the boot path indicator, executing, by the BIOS firmware, the boot path indicated by the boot path indicator, wherein executing the boot path corresponding to the boot path indicator comprises:
retrieving configuration information associated with the boot path corresponding to the boot path indicator;
generating a configuration of the firmware that is associated with the boot path based on the retrieved configuration information; and
performing the configuration of the firmware, including initializing at least one firmware module that is specified by the retrieved configuration information associated with the boot path; and
launching, by the BIOS firmware, an operating system, among a plurality of operating systems, that is supported by the boot path that corresponds to the boot path indicator.

10. The non-transitory computer-readable storage medium of claim 9, wherein retrieving the configuration information associated with the boot path corresponding to the boot path indicator further comprises accessing a configuration table associated with the boot path, wherein the configuration is performed based on information specified in the accessed configuration table.

11. The non-transitory computer-readable storage medium of claim 10, wherein performing the configuration comprises initializing at least one firmware module specified in the configuration table.

12. The non-transitory computer-readable medium of claim 9, wherein the computer-executable instructions which, when executed by the computer, cause the computer to launch the operating system also cause the computer to mount a boot device containing the operating system corresponding to the boot path.

13. The non-transitory computer-readable storage medium of claim 9, wherein the boot path indicator is received from a user input including at least one of a hotkey, a switch, a button and other input operated by a user.

14. The non-transitory computer-readable storage medium of claim 9, having further computer-executable instructions stored thereupon which, when executed by the computer, cause the computer to set, a boot path selector application, a value corresponding to the boot path indicator within a non-volatile memory.

15. The non-transitory computer-readable storage medium of claim 9, having further computer-executable instructions stored thereupon which, when executed by the computer, cause the computer to retrieve the value corresponding to the boot path indicator, set by the boot path selector application, from the non-volatile memory upon subsequent booting of the computer.

16. A computer system for supporting multiple boot paths, comprising:
a central processing unit (CPU); and
a non-volatile memory having at least one operating system and a including Basic Input/Output System (BIOS) firmware executable by the CPU stored therein, the BIOS firmware comprising-instructions which, when executed by the CPU, cause the CPU to perform operations comprising:
receiving a boot path indicator indicating a boot path, among the multiple boot paths, to be executed by the BIOS firmware,
responsive to receiving the boot path indicator, causing the BIOS firmware to execute the boot path corresponding to the boot path indicator, wherein executing the boot path corresponding to the boot path indicator comprises:
retrieving configuration information associated with the boot path corresponding to the boot path indicator;
generating a configuration of the firmware that is associated with the boot path based on the retrieved configuration information; and
performing the configuration of the firmware, including initializing at least one firmware module that is specified by the retrieved configuration information associated with the boot path, and
causing the BIOS firmware to launch the at least one operating system, among a plurality of operating systems, that is supported by the boot path that corresponds to the boot path indicator.

17. The computing system of claim 16, wherein retrieving the configuration information associated with the boot path corresponding to the boot path indicator further comprises accessing a configuration table associated with the boot path, wherein the configuration is performed based on information specified in the accessed configuration table.

18. The computer system of claim 16, wherein the instructions which, when executed by the CPU, cause the CPU to launch the operating system also cause the CPU to mount a boot device containing the operating system corresponding to the boot path.

19. The computer system of claim 16, wherein the BIOS firmware comprises further instructions which, when executed by the CPU, cause the CPU to set, by a boot path selector application, a value corresponding to the boot path indicator within the non-volatile memory.

20. The computer system of claim 16, wherein the BIOS firmware comprises further instructions which, when executed by the CPU, cause the CPU to retrieve the value corresponding to the boot path indicator, set by the boot path selector application, from the non-volatile memory upon subsequent booting of the computer system.

* * * * *